United States Patent
Shipman, Jr. et al.

(10) Patent No.: US 9,106,789 B1
(45) Date of Patent: Aug. 11, 2015

(54) VIDEOCONFERENCE AND VIDEO VISITATION SECURITY

(75) Inventors: Bobby L. Shipman, Jr., Jonesboro, AR (US); Laura Shipman, Jonesboro, AR (US)

(73) Assignee: Tech Friends, Inc., Jonesboro, AR (US)

( * ) Notice: Subject to any disclaimer, the term of this patent is extended or adjusted under 35 U.S.C. 154(b) by 611 days.

(21) Appl. No.: 13/355,211

(22) Filed: Jan. 20, 2012

(51) Int. Cl.
*H04N 7/14* (2006.01)
*H04N 7/15* (2006.01)
*H04N 21/44* (2011.01)

(52) U.S. Cl.
CPC ............. *H04N 7/15* (2013.01); *H04N 7/147* (2013.01); *H04N 7/155* (2013.01); *H04N 21/44008* (2013.01)

(58) Field of Classification Search
CPC .......... H04M 2201/40; H04M 3/4936; H04M 3/5191; H04N 5/272; H04N 7/14; H04N 7/141; H04N 7/142; H04N 7/144; H04N 7/147; H04N 7/148; H04N 7/15; H04N 7/152; H04N 7/155; H04N 7/157
USPC ............ 348/14.03, 14.08, 14.1, 14.11, 14.01, 348/14.02, 14.04, 14.05, 14.06, 14.07, 348/14.09, 14.12, 14.13, 14.14, 15.15, 348/14.16; 379/265.03; 455/414.1, 566; 704/270
See application file for complete search history.

(56) References Cited

U.S. PATENT DOCUMENTS

| | | | | |
|---|---|---|---|---|
| 5,274,453 | A * | 12/1993 | Maeda ........................... | 348/584 |
| 8,571,192 | B2 * | 10/2013 | Etter ......................... | 379/202.01 |
| 8,648,894 | B2 * | 2/2014 | Laney et al. ................ | 348/14.03 |
| 2005/0128283 | A1 * | 6/2005 | Bulriss et al. ................. | 348/14.1 |
| 2006/0087554 | A1 * | 4/2006 | Boyd et al. .................. | 348/14.09 |
| 2006/0087555 | A1 * | 4/2006 | Boyd et al. .................. | 348/14.09 |
| 2007/0188596 | A1 * | 8/2007 | Kenoyer ..................... | 348/14.08 |
| 2007/0285504 | A1 * | 12/2007 | Hesse .......................... | 348/14.08 |
| 2008/0201158 | A1 * | 8/2008 | Johnson et al. ..................... | 705/1 |
| 2010/0245532 | A1 * | 9/2010 | Kurtz et al. ................. | 348/14.03 |
| 2011/0096139 | A1 * | 4/2011 | Rudolf ........................ | 348/14.11 |
| 2012/0127284 | A1 * | 5/2012 | Bar-Zeev et al. ............... | 348/53 |
| 2012/0262271 | A1 * | 10/2012 | Torgersrud et al. .......... | 340/5.53 |
| 2012/0274724 | A1 * | 11/2012 | Cross et al. .................. | 348/14.1 |
| 2012/0281058 | A1 * | 11/2012 | Laney et al. ............... | 348/14.03 |
| 2013/0182061 | A1 * | 7/2013 | Stedman et al. ........... | 348/14.03 |
| 2013/0263227 | A1 * | 10/2013 | Gongaware et al. ............. | 726/4 |
| 2013/0278631 | A1 * | 10/2013 | Border et al. ................. | 345/633 |

FOREIGN PATENT DOCUMENTS

WO    WO 2012057655 A1 *    5/2012         G06F 17/30793

* cited by examiner

*Primary Examiner* — Khai N Nguyen
(74) *Attorney, Agent, or Firm* — Fogarty, L.L.C.

(57) ABSTRACT

Systems and methods for providing video visitation security to a controlled-environment facility are disclosed. In some embodiments, a method may include detecting an image of a face in a video stream transmitted between a resident (e.g., an inmate) of a controlled-environment facility (e.g., a jail or prison) and a non-resident of the controlled environment facility during a video visitation session. For example, the first image may occupy a given area on a display upon rendering of the video stream. As such, the method may include defacing (e.g., blurring, clouding, darkening, distorting, masking, shading, etc.) other areas on the display outside of the given area. Moreover, in various implementations, a method may also include detecting additional faces, determining and/or validating any number of visitors (e.g., via facial recognition), identifying certain attempts to circumvent security procedures, as well as taking pre-established corrective measures.

28 Claims, 6 Drawing Sheets

VIDEOCONFERENCE AND VIDEO VISITATION SECURITY

TECHNICAL FIELD

This specification relates generally to videoconferencing and video visitation, and, in one embodiment, to video visitation security for controlled-environment facilities.

BACKGROUND

In the United States, after a person is arrested, detained, or otherwise committed to a correctional facility, that person is typically afforded certain visitation rights. Particularly, while residing within a correctional facility, an inmate may desire or need to communicate with non-residents of that facility, such as, for example, family members, friends, lawyers, etc. Depending upon the facility's internal procedures (e.g., predetermined days and times when visitation is allowed, etc.), the inmate may request that the visitation be arranged. Conversely, a non-resident desiring to have the visitation may contact the facility to initiate the request.

In many situations, visitations are performed in person—i.e., the non-resident physically travels to the correctional facility, complies with a security clearance protocol (e.g., ID verification, metal detector, body scan, etc.), and meets with the incarcerated resident in a secured location, usually under supervision of the facility's staff (e.g., a police officer or deputy, U.S. Marshal, etc.). Because in-person visitation can consume a significant amount of resources, and because many correctional facilities are typically operating at or above capacity, visitation requests may have to be booked a significant amount of time in advance.

As the inventors here of have recognized, however, recent developments in telecommunication systems and computer networks now allow remote, video visitation to take place. Generally speaking, by implementing video visitation systems, a correctional facility can potentially utilize its resources more efficiently, while providing better and more responsive services to its residents.

SUMMARY

This specification relates to systems and methods for providing video visitation security to controlled-environment facilities. In an illustrative, non-limiting embodiment, a method may include detecting a first image of a first face in a video stream transmitted between a resident of a controlled-environment facility and a non-resident of the controlled environment facility during a video visitation session. The first image may occupy a first area on a display upon rendering of the video stream. The method may then include defacing other areas on the display outside of the first area.

For example, the controlled-environment facility may be a jail or prison, and the resident may be an inmate. Moreover, defacing may include blurring, clouding, darkening, distorting, masking, shading, or the like. In some cases, the video stream may be a live, a pre-recorded, or a delayed transmission video message.

In some implementations, the method may also include performing facial recognition on the first image and, in response to the facial recognition determining that the first face does not match a face of an authorized visitor, causing that some form of corrective action be taken (e.g., termination of the video visitation session, recording of the video visitation session, flagging of the video visitation session, notification of a third-party, etc.). Moreover, performing the facial recognition may include retrieving a video visitation record including a facial characteristic of the authorized visitor.

Additionally or alternatively, the method may include detecting a second image of a second face in the video stream during the video visitation session, the second image occupying a second area on the display upon rendering of the video stream. In these cases, defacing may include defacing areas on the display outside the first and second areas combined. Furthermore, the method may include retrieving a video visitation record corresponding to the video visitation session, where the video visitation record includes a number of authorized visitors, and determining that the number of authorized visitors is greater than 1. Conversely, if the number of authorized visitors is equal to 1, the method may include taking corrective action.

In some implementations, detecting and defacing may occur continuously during the video visitation session, and the size and position of the first image may change throughout the video visitation session. As such, the method may include detecting a change in the first image, determining a magnitude of the change, and taking corrective action in response to the magnitude of the change meeting a magnitude threshold. Additionally or alternatively, the method may include determining a duration of the change and taking the corrective action in response to the duration of the change meeting a duration threshold.

In some cases, the method may include detecting an alphabetic, numeric, or symbolic character, a non-biometric object, a bodily movement unrelated to speech, a hand gesture or sign language, etc., and taking appropriate corrective action (e.g., defacing the offending content or material, etc.). For example, the method may include determining a correlation between a mouth movement and speech in the video stream. If the correlation drops below a threshold level, the method may mute the audio portion of the video stream, blank the video portion of the stream, etc. Additionally or alternatively, the method may identify an affiliation of the resident or non-resident with a given gang or group based, at least in part, upon the offending content.

In another illustrative, non-limiting embodiment, a method may include identifying a video visitation session between a resident of a correctional facility and a non-resident of the correctional facility, detecting one or more images of one or more faces present in a video stream transmitted from the non-resident to the resident during the video visitation session, where the one or more images of the one or more faces occupy one or more areas upon rendering of the video stream on a screen, and degrading images on the screen outside of the one or more areas.

For example, the method may include retrieving a video visitation record, the record indicating a number of visitors expected during the video visitation session, and taking corrective action in response to the number of expected visitors being smaller than the number of one or more images of the one or more faces. Conversely, in response to the number of expected visitors being greater than the number of one or more images of the one or more faces, the method may include recording an absence of an expected visitor in the video visitation record.

Additionally or alternatively, the method may include retrieving a video visitation record, the record including a facial characteristic of visitors expected during the video visitation session, performing facial recognition upon the one or more images of one or more faces and, in response to the facial recognition determining that at least one of the one or more faces do not match facial characteristic, taking corrective action. The method may further include detecting a change in the one or more images, determining a magnitude of the change, determining a duration of the change in response to the magnitude of the change meeting a magnitude threshold, and taking the corrective action in response to the duration of the change meeting a duration threshold.

In yet another illustrative, non-limiting embodiment a method may include identifying a video visitation session between a resident of a controlled-environment facility and a non-resident of the controlled-environment facility and detecting one or more images of one or more faces present in a video stream transmitted by the non-resident and received by the resident, the one or more images of the one or more faces occupying one or more facial areas upon rendering of the video stream on a screen accessible to the resident during the video visitation session. The method may also include, in response to a number of the one or more faces matching an expected number of faces prescribed by a video visitation record, performing facial recognition upon the one or more images of the one or more faces. The method may further include, in response to the facial recognition determining that the one or more faces match one or more faces of expected visitors and prescribed by the video visitation record, allowing the video visitation session to take place while disfiguring areas outside of the one or more facial areas on the screen.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, a system may include at least one processor and a memory coupled to the at least one processor, the memory configured to store program instructions executable by the at least one processor to cause the system to execute one or more operations disclosed herein.

BRIEF DESCRIPTION OF THE DRAWINGS

Reference will now be made to the accompanying drawings, wherein.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

This specification discloses systems and methods for providing video visitation security to controlled-environment facilities. Various types of controlled-environment facilities are present in today's society, and persons may be voluntary or involuntary residents of such facilities, whether temporarily or permanently, full-time or part-time. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like.

Controlled-environment facilities, such as the ones described above, may sometimes be thought of as a small community or city, perhaps walled or otherwise access restricted, wherein various activities occur within the community and between the community and those outside the community in the daily operation thereof. Such a community includes a number of individuals and enterprises directly associated therewith, including management, staff, and inmates, residents, patients, or guests, and a number of individuals and enterprises indirectly associated therewith, including friends and family of residents, vendors, government agencies, providers of services to residents, and individuals with a connection to the facility or its residents. Information is often exchanged and transactions are often conducted by, between, among, and on behalf of the aforementioned individuals and enterprises in performing their day-to-day activities. For example, residents of a controlled-environment facility may receive visitation, including video visitation, from non-residents of that facility.

For convenience of explanation, various examples discussed herein are presented in the context of correctional facilities. For instance, in some of the embodiments discussed below, a controlled-environment facility may be referred to as a jail or prison, and its residents may be referred to as arrestees, detainees, or inmates. It should be understood, however, that the systems and methods described herein may be similarly applicable to other types of controlled-environment facilities and their respective residents (e.g., a hospital and its patients, a school dormitory and its students, etc.).

Figure 1:
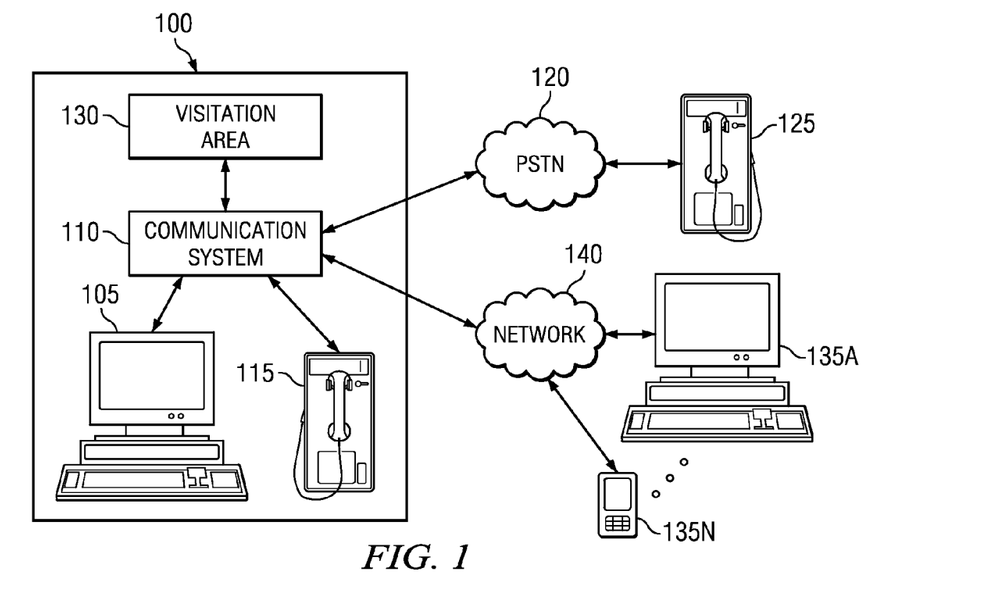
FIG. 1 is a block diagram of an illustrative environment where various systems and methods described herein may be implemented according to some embodiments.

Turning now to FIG. 1, a block diagram of an illustrative environment where various techniques described herein may be implemented is depicted according to some embodiments. As shown, prison 100 may host a plurality of inmates. In a typical scenario, immediately upon arrival at prison 100, each inmate may be subject to an "intake" or "booking" process, whereby certain information may be collected by prison staff via prison administration terminal or system 105. For example, the inmate's name, gender, address, date of birth, etc. may be received by system 105 and stored in a prison administration database. According to some embodiments, in addition to identification information, system 105 may also be configured to receive biometric samples (e.g., fingerprints, voice prints, iris scans, facial images or signatures etc.) and store one or more such samples as biometric signatures that may later be used, for example, to validate the identify of an inmate over the course of a video visitation session.

In some embodiments, prison 100 may allow an inmate to make or receive phone calls using device 115 via communication system 110. To that end, communication system 110 may include one or more analog switches, IP gateways, PBX systems, etc. that provide communication systems to prison 100. For example, an inmate within prison 100 may use device 115 to make a telephone call to (or to receive a telephone call from) a non-resident of prison 100 operating device 125 through public switched telephone network (PSTN) 120.

Although shown as telephones in FIG. 1, devices 115 and 125 may include any communication device such as, for example, an analog telephone, a Voice over IP (VoIP) phone, a video visitation system, an Internet terminal, etc. For example, in some embodiments, non-resident device 115 may be operable to communicate with device 125 through network 140. Network 140 may include, for example, the Internet. Additionally or alternatively, network 140 may include wireless cellular networks or the like.

During their commitment to prison 100, inmates may be allowed to visit non-residents at a designated location within prison 100, such as, for example, visitation area 130. In some cases, visitation area 130 may include one or more rooms where an inmate may interact with a visiting non-resident in person. Additionally or alternatively, visitation area 130 may allow an inmate to communicate with a remotely located non-resident via a video visitation station or terminal 200A-N (shown in FIG. 2). For example, a non-resident may use computer or communication devices 135A-N to communicate or otherwise interact with a resident operating one of stations 200A-N over network 140.

In some embodiments, prison administration system 105 may store records that identify visitation requests made by inmates and/or non-residents. These records may be used by system 150 and/or prison staff, for example, to help schedule future visitation sessions, for investigative purposes, etc. As such, each record may include, for instance, a type of visitation (e.g., in person or by video), a date and time when the visitation is requested to take place, an identification of the inmate involved in the visitation, and an identification of the non-resident(s) involved in the visitation. In the case of a video visitation, the visitation record may also include facial images and/or signatures of the parties expected to be involved or otherwise authorized to participate in the visitation. In some cases, a pre-registration or enrollment procedure may be put in place requiring persons wishing to participate in a video visitation session to first appear in person or submit pictures to prison 100 so that system 105 may collect information sufficient to generate corresponding facial images and/or signatures.

Figure 2:
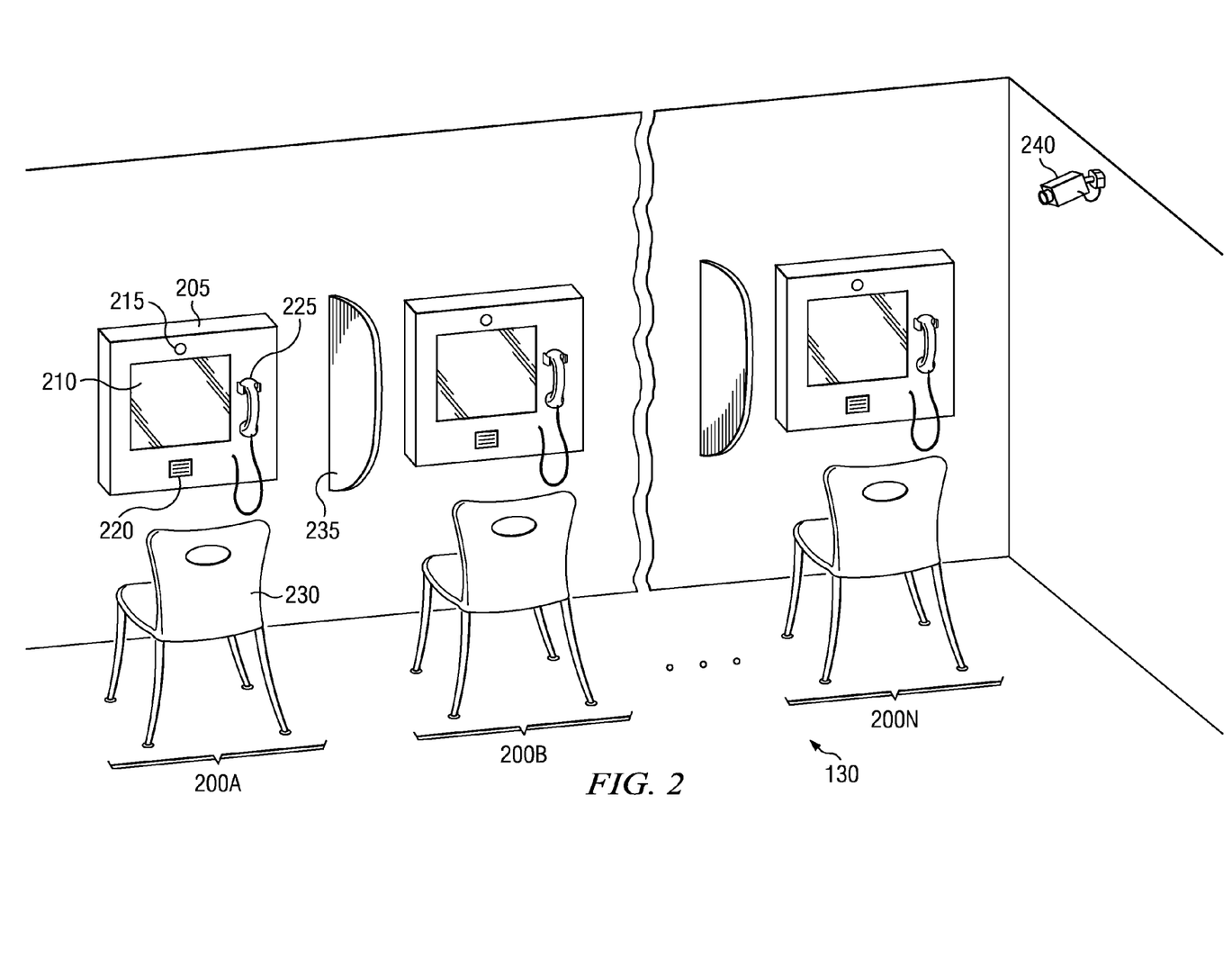
FIG. 2 is a block diagram of a video visitation area within a controlled-environment facility according to some embodiments.

FIG. 2 is a block diagram of a video visitation area within a controlled-environment facility according to some embodiments. At the scheduled day and time of a video visitation, prison staff may direct the involved inmate to leave his or her cell and travel to one of video visitation stations 200A-N within visitation area 130. Alternatively, video visitation stations 200A-N may be implemented in a mobile or portable device (e.g., a tablet computer or the like), and therefore prison staff may simply take the video visitation to the inmate in his or her cell. In some implementations, video visitation stations 200A-N may be separated by dividers 235 and monitored by surveillance system 240 (e.g., closed-circuit television or CCTV).

As illustrated in FIG. 2, a given one of video visitation stations 200A-N (e.g., 200A) may include enclosure or base 205, display or screen 210, camera and/or microphone 215, and speaker or audio output 220. Camera 215 may include a digital video camera or the like, and screen 210 may include a liquid crystal display (LCD), plasma, or cathode ray tube (CRT) display. In some cases, screen 210 may include a touchscreen configured to accept data input from a user. Additionally or alternatively, video visitation station 200A may include handset or headset 225 configured to perform audio input and/or output operations. Moreover, in various embodiments, video visitation station 200A may also include a biometric sensor (e.g., thumbprint scanner, iris scanner, etc.), a radio frequency identification (RFID), a barcode scanner, or the like.

Upon arrival at video visitation 130, an inmate may be directed to an available one of one of video visitation stations 200A-N (e.g., 200A) and may take seating 230. Station 200A may then take authentication information from the inmate such as, for example, ID, username, biometric information, bar code, RFID bracelet, facial recognition, etc. Once the inmate's identification is verified (e.g., matched against a video visitation record), the inmate may then have a video feed or stream established between station 200 and a non-resident. In some cases, the non-resident may also be authenticated prior to the initiation of the video visitation session.

In some implementations, communication system 110 may establish and maintain communication between video visitation stations 200A-N and non-resident's devices 135A-N during a session. As illustrated in FIG. 1, communication system 110 may be located inside of prison 100. In other embodiments, however, system 110 and/or components thereof may be disposed outside prison 100. Furthermore, FIG. 1 shows a single prison 100 served by a single communication system 110 for ease of explanation only. In other embodiments, two or more prisons may be served by the same communication system 110 and/or two or more of each such system may serve the same prison. Also, it should be noted that communication system 110 may be distributed across different geographical areas.

Figure 3:
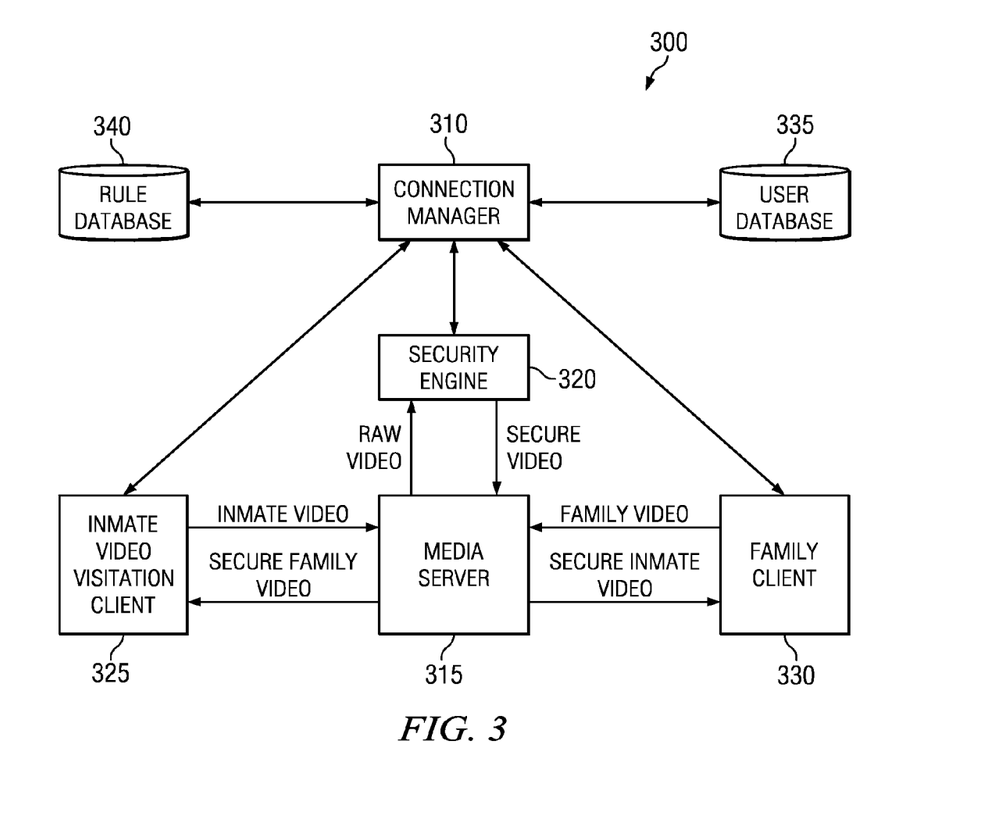
FIG. 3 is a block diagram of a video visitation security system according to some embodiments.

FIG. 3 is a block diagram of video visitation security system 300. In some embodiments, system 300 may be stored and/or executed, at least in part, by any given one of video visitation stations 200A-N. In other embodiments, system 300 may be implemented by a dedicated visitation computer and/or by communication system 110. As illustrated, system 300 may include connection manager 310 operable to establish and maintain a connection between two endpoints, such as, for example, inmate video visitation client or resident client 325 (e.g., station 200A) and family client 330 (e.g., device 135A). As such, system 300 may implement a set of telecommunication technologies that allow the endpoints to communicate via two-way video and audio transmissions concurrently or simultaneously. In some cases, the video communication may include a live, pre-recorded, or delayed transmission video message. Furthermore, although described in an example herein as a "family client," it should be understood that client 330 may be used in any other video visitation or teleconference setting such as, for example, in an inmate's appearance at a video courtroom trial, bail/status hearings, attorney meeting, etc. It will be understood that the systems and methods used herein are not limited to a controlled-environment facility, but may be used in any other video visitation or teleconference setting not associated with an inmate, family, and/or prison.

Connection manager 310 may be configured to retrieve a video visitation record from rules database 340 and/or prison administration system 105, for example, and to initiate a connection to at least one of the endpoints identified in the video visitation record. As such, connection manager 310 may be configured to receive a connection request, authenticate one or more users, and ensure that the requested connection is allowed, for example, based on rules database 340. Examples of rules stored in database 340 may include authentication rules (e.g., is the person allowed to communicate with the target recipient; does a resident have unused visitation time for the relevant time period; is the resident under any restrictions or conditions—e.g., lockdown, behavior, illness, etc.—that would cause denial of a visitation request; is the controlled-environment facility currently allowing visitations; do the biometrics for the individuals match those stored in a database of pre-enrolled or registered individuals; etc.).

In some implementations, connection manager 310 may also be configured to assign a stream name and password for sending raw audio/video stream, assign a stream name and password for receiving secure audio/video stream, save stream information in a connection table, and return the stream names and passwords to the client requesting a connection. Connection manager 310 may also be configured to call and/or initiate security engine 320 to process incoming streams.

In various embodiments, security engine 320 may execute user authentication, facial detection, object detection, Optical Character Recognition (OCR), Intelligent Character Recognition (ICR), and/or facial recognition operations. Generally speaking, various image and video processing operations are known to persons of ordinary skill in the art. For example, particularly with respect to face detection, security engine 320 may implement an algorithm similar to "*Facial Feature Detection Using Haar Classifiers*," Wilson and Fernandez, Journal of Circuits, Systems, and Computers (JCSC) 21, 4 (April 2006), which is hereby incorporated by reference herein in its entirety. Security engine 320 may also be configured to evaluate various data during a video conferencing session and to implement appropriate corrective action in response to actual or potential security breaches. One or more of corrective actions may be prescribed, for example, by rules database 340. Additionally or alternatively, security engine 320 may be programmed with a set of such rules.

In operation, security engine 320 may connect to media server 315's incoming stream using unsecured stream name and password for reading. Security engine 320 may also connect to media server 315's outgoing stream using secured stream name and password for writing. Then, security engine 320 may read the unsecured video stream and, while video is received, it may, for example, (a) create a full frame image; (b) perform image detection algorithms on image (facial detection, facial recognition, biometric template matching, object detection, OCR, ICR, etc.); (c) if no face is detected, blank the full image; (d) if illegal or unauthorized text or objects are detected within the image, blank the full image; (e) blank non-facial areas in the full image; (f) encode the modified image for video transmission (e.g., H.264); (g) write the video stream to the media server secured stream; etc. These, and other operations, are described in more detail in connection with FIGS. 5-9 below.

In some embodiments, a resident may interact with software client 325 interfaced to a camera and microphone system for recording resident audio and video as well as a monitor and speaker system for displaying received audio and video from a non-resident. When a resident initiates the video visitation, resident client 325 communicates with the connection manager component 310 via a suitable protocol, such as, for example, a web service call or the like. Connection manager 310 queries user database 335 to validate the resident using various methods including but not limited to password and/or biometric data such as facial characteristics, iris scan, fingerprint, or voiceprint. Once the resident has been authenticated, connection manager 310 may return information such as username, password, secure token, IP address, and/or IP port to resident client 325, which in turn enables resident client 325 to connect to media server 315.

Resident client 325 then connects to the media server 315 and begins to send and receive audio/video information using an appropriate protocol, such as, for example, H.264 encoding or the like. Once a connection request is received from resident client 325 or non-resident client 330, connection manager 310 may start a security engine 320 process for the video visitation session. Security engine 320 may receive connection information such as username, password, secure token, IP address, and/or IP port from the connection manager 310 and it may utilize this information to connect to the media server 315. Thereafter, security engine 320 may receive raw audio/video streams, perform security algorithms such as facial detection upon the stream, and then modify one or more aspects of the video stream if necessary.

For example, during a visitation session, resident client 325 may provide non-secure "inmate video" to media server 315, which in turn forwards that feed to security engine 320. Security engine 320 analyzes the incoming non-secure feed, processes it as appropriate, and returns a processed, "secure video" to media server 315. Media server 315 then transmits the secure video as "secure inmate video" to non-resident client 330. A similar protocol may be followed in the opposite direction to provide full-duplex, secure video visitation. That is, non-resident client 330 may send a non-secure "family video" feed to media sever 315, which transmits "raw video" to security engine 320 and receives a "secure video" in return. Media server 315 then forwards the "secure family video" to resident client 325.

In various embodiments, certain modules shown in FIG. 3 may represent sets of software routines, logic functions, and/or data structures that are configured to perform specified operations. Although these modules are shown as distinct logical blocks, in other embodiments at least some of the functionality provided by these modules may be combined into fewer blocks. Conversely, any given one of modules 305-320 may be implemented such that its functionality is divided among two or more logical blocks. Moreover, although shown with a particular configuration, in other embodiments these various modules may be rearranged in other suitable ways.

For example, in some cases, one or more of the operations performed by security engine 320 may be distributed to inmate video visitation client 325 and/or family client 330. In those implementations, rather than media server 315 providing "raw video" to (and receiving "secure video" from) security engine 320, a security module residing at family client 330 may provide "secure family video" directly from client 330 to media server 315. Conversely, another security module residing at inmate video visitation client 325 may provide "secure inmate video" directly from client 325 to media server 315. Hence, instead of transmitting a full image to media server 315, only the face portion of the image may be transmitted (e.g., an offending part of an image may be removed or defaced by the sender, which then transmits a smaller image). Furthermore, in some instances, connection manager 310 and/or media server 315 may also reside, at least in part, within clients 325 and/or 330.

Figure 4:
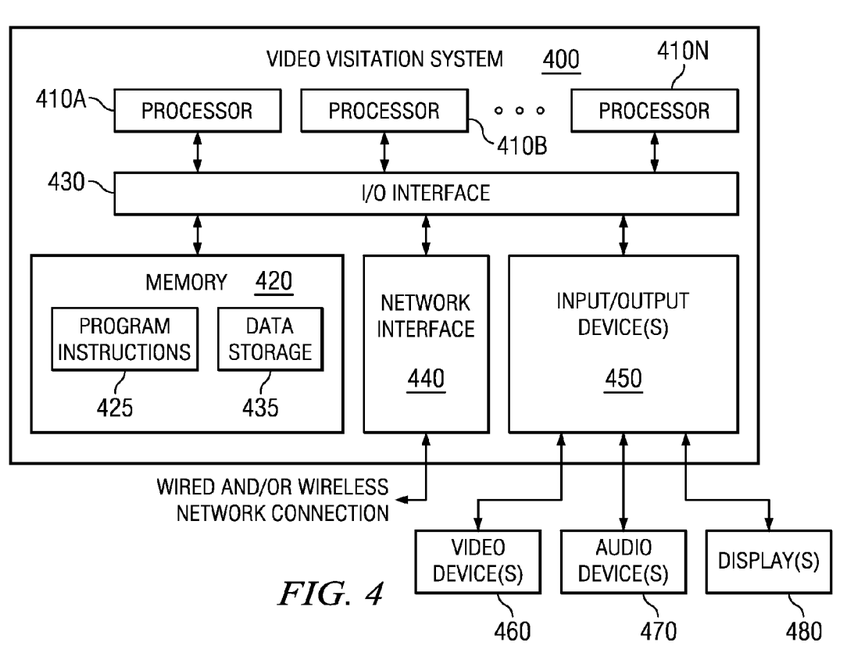
FIG. 4 is a block diagram of a computer system, device, or station configured to implement various techniques disclosed herein according to some embodiments.

Embodiments of systems and methods for video visitation security in controlled-environment facilities, as described herein, may be implemented or executed by one or more computer systems. One such computer system is illustrated in FIG. 4. In various embodiments, video visitation system or station 400 may be a server, a mainframe computer system, a workstation, a network computer, a desktop computer, a laptop, or the like. For example, in some cases, account video visitation stations 200A-N shown in FIG. 2 may each be implemented as computer system 400. Moreover, terminal 105, non-resident's equipment 135A-N, and/or communication system 110 may also include one or more computers similar to computer system 400. As explained above, in different embodiments these various computer systems may be configured to communicate with each other in any suitable way, such as, for example, via network 140.

As illustrated, video visitation system 400 includes one or more processors 410 coupled to a system memory 420 via an input/output (I/O) interface 430. Video visitation system 400 further includes a network interface 440 coupled to I/O interface 430, and one or more input/output devices 450, such as video device(s) 460 (e.g., a camera), audio device(s) 470 (e.g., a microphone and/or a speaker), and display(s) 480. Video visitation system 400 may also include a cursor control device (e.g., a mouse or touchpad), a keyboard, etc. Multiple input/output devices 450 may be present in video visitation system 400 or may be distributed on various nodes of computer system 400. In some embodiments, similar input/output devices may be separate from video visitation system 400 and may interact with one or more nodes of video visitation system 400 through a wired or wireless connection, such as over network interface 440.

In various embodiments, video visitation system 400 may be a single-processor system including one processor 410, or a multi-processor system including two or more processors 410 (e.g., two, four, eight, or another suitable number). Processors 410 may be any processor capable of executing program instructions. For example, in various embodiments, processors 410 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 410 may commonly, but not necessarily, implement the same ISA. Also, in some embodiments, at least one processor 410 may be a graphics processing unit (GPU) or other dedicated graphics-rendering device.

System memory 420 may be configured to store program instructions and/or data accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described in connection with FIGS. 6 and 7, may be stored within system memory 420 as program instructions 425 and data storage 435, respectively. In other embodiments, program instructions and/or data may be received, sent or stored upon different types of computer-accessible media or on similar media separate from system memory 420 or computer system 400. Generally speaking, a computer-readable medium may include any tangible or non-transitory storage media or memory media such as magnetic or optical media—e.g., disk or CD/DVD-ROM coupled to video visitation system 400 via I/O interface 430, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 440.

In an embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any suitable protocol, timing or other data transformations to convert data signals from one component (e.g., system memory 420) into a format usable by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. In addition, in some embodiments, some or all of the functionality of I/O interface 430, such as an interface to system memory 420, may be incorporated into processor 410.

Network interface 440 may be configured to allow data to be exchanged between video visitation system 400 and other devices attached to a network, such as other computer systems, or between nodes of computer system 400. In various embodiments, network interface 440 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 4, memory 420 may include program instructions 425, configured to implement certain embodiments described herein, and data storage 435, comprising various data accessible by program instructions 425. In an embodiment, program instructions 425 may include software elements corresponding to one or more of the various embodiments illustrated in the above figures. For example, program instructions 425 may be implemented in various embodiments using any desired programming language, scripting language, or combination of programming languages and/or scripting languages (e.g., C, C++, C#, JAVA®, JAVASCRIPT®, PERL®, etc.). Data storage 435 may include data that may be used in these embodiments. In other embodiments, other or different software elements and data may be included.

A person of ordinary skill in the art will appreciate that video visitation system 400 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Figures 5A, 5B, 5C:
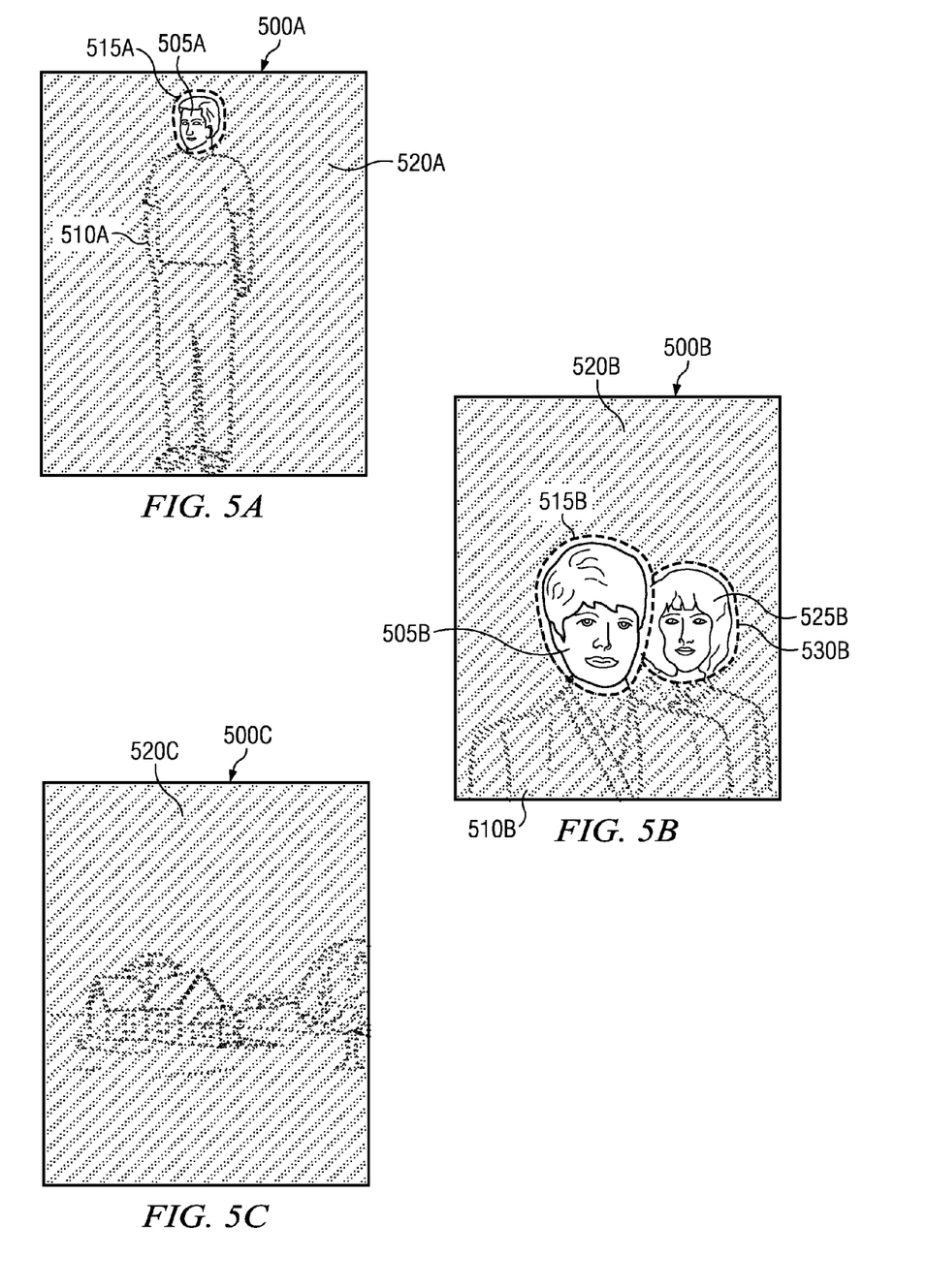
FIGS. 5A-C are diagrams illustrating various video visitation security techniques according to some embodiments.

Turning now to FIGS. 5A-C, diagrams showing various video visitation security techniques are depicted according to some embodiments. Particularly, FIGS. 5A-C illustrate different video streams as rendered on display 210A within visitation area 130 of prison 100 during a visitation session. In FIG. 5A, non-resident may operate device 135A-N to create a video feed that is transmitted to station 200A such that the resident's entire body 510A is captured. In this situation, video security module 320 of software 300 may be configured to execute a facial detection operation that identifies area 515A of screen 500A where the non-resident's face 505A is being rendered by video conferencing engine 315. Then video security module 320 may blur, cloud, darken, distort, mask, shade or otherwise deface other areas 520A in the video feed, including, for example, the non-resident's body 510A. As such, security module 320 may operate to limit a non-resident's ability to show anything other than his or her face to an inmate during a video visitation. In some embodiments, these techniques may prevent inmates from receiving nude, sexual, or pornographic images within prison 100.

In some implementations, only the portions of a given image that are allowed by security module 320 may be transmitted to a receiver. In these cases, in FIG. 5A, for example, non-facial areas 520A of image 500A may be removed or cropped by security module 320 prior to sending "secure video" to media server 315. Additionally or alternatively, non-facial areas 520A may be replaced with pixels of a selected color or pattern (e.g., black, white, etc.). As such, these embodiments may require lower bandwidth because images may become smaller and/or more easily compressed by a suitable video-encoding algorithm.

In FIG. 5B, non-resident 510B may operate device 135A-N to create a video feed that is transmitted to station 200A such that his or her head 505B is captured. In this example, however, another non-resident's face 525B may appear. Therefore, security module 320 may detect first and second facial areas 515B and 530B, and may cause other areas 520B of image 500B to be defaced. Additionally or alternatively, as described in connection with FIG. 8, security module 320 may determine, based at least in part on a video visitation record stored by prison administration system 105, that only one (or a fewer number of) non-resident(s) is (are) authorized to participate in the video visitation session, and may trigger corrective action as appropriate. Additionally or alternatively, as also described in connection with FIG. 8, security module 320 may execute face recognition routines to determine that one of faces 505B or 525B is not authorized to participate in the video visitation prior to taking one or more corrective actions. Meanwhile, FIG. 5C illustrates a scenario where feed 500C does not appear to contain a face at all. For instance, the non-resident may point its device 135A-N outside a window, to a picture or photograph, a document, etc. In these cases, entire image 520C may be defaced.

Figure 6A:
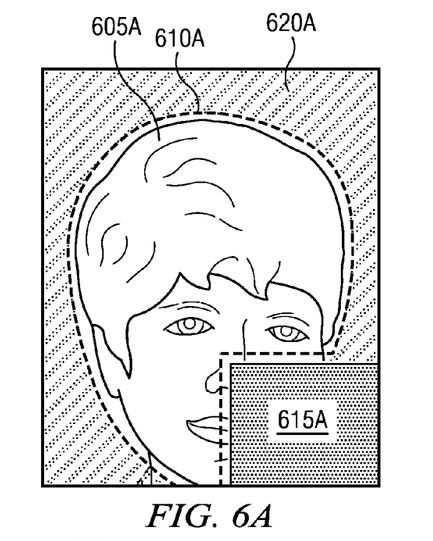
FIGS. 6A-E are diagrams illustrating additional video visitation security techniques according to some embodiments.
Figure 6B:
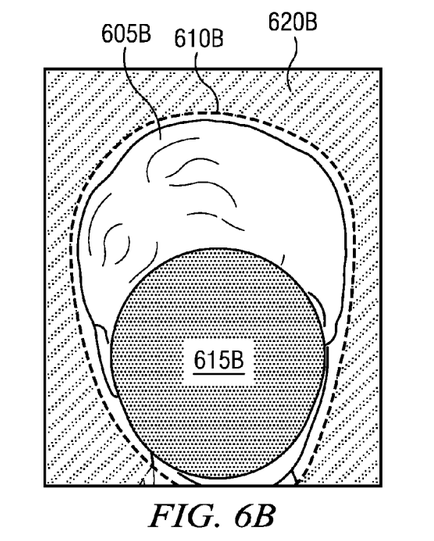

FIGS. 6A-6E are diagrams illustrating additional video visitation security techniques according to some embodiments. It will be understood that these techniques would apply to both residents and non-residents or any other video visitation participant. Particularly, FIG. 6A shows a situation where a non-resident may frame device 135A-N such that the video feed is mostly covered by his or her face 605A. As before, security module 320 may detect area 610A as containing face 605A, and may blur or deface region 620A. In this case, the non-resident may, during progress of the video visitation, insert object 615A in front of his or her face 605A such that it is captured in the video feed. In some implementations, security module 320 may be configured to deface object 615A. In other implementations, however, security module 320 may not be capable of detecting object 615A, and may therefore display the portion of object 615A overlapping with face 605A. FIG. 6B shows a similar situation with respect to elements 605B-615B, but it should be noted that object 615B is larger than object 615A relative to faces 605A-B, respectively. As described in more detail with respect to FIG. 9, security module 320 may continuously or periodically monitor a video visitation session to determine the degree and duration of changes with respect to previously detected face areas of a video stream, and it may take corrective action as appropriate.

In some embodiments, a standard geometric shape (e.g., circle, square, rectangle, oval, etc.) defining non-facial area 620B may be appropriately sized to cover a predetermined area or percentage relative to the size of face 605B. For example, shape 610B may be designed such that, at 80%, it would show some, but not entire face 605B. At 100%, shape 610B's dimensions may match all of face 605B. At 120%, shape 610B's dimensions may create a cushion area around face 605B (i.e., area 610B may be slightly greater than face 605B) such face 605B does not become inadvertently obscured, for example, due to subtle or natural movements, etc. Additionally or alternatively, shape 610B may be defined by a non-standard shape that is adapted to fit the outline of face 605B (e.g., a show area inside a face-silhouette shape and block areas outside of it). Again, the dimensions of such a non-standard shape may vary (e.g., 80%, 100%, 120%, etc.) to encompass a larger or smaller area of face 605B.

Moreover, the relative size of shape 610B with respect to face 605B may be modified during a video conference depending upon restrictions associated with a particular inmate or visitor, events that may occur during the visitation (e.g., presence of a foreign object, etc.), or the like. For instance, if security module 320 of FIG. 3 detects a possible infraction during a visitation (e.g., a visitor is attempting to introduce another, non-authorized person in the same feed, security module 320 may then reduce the size of shape 610B relative to face 605 to exclude additional non-facial portions. Conversely, if a given inmate has no history of prior infractions and, for example, the visitor is the inmate's child, security module 320 may increase the relative size of area 610B relative to face 605B. More generally, the shape and relative size of facial area 610B may be varied dynamically during display of the video feed depending upon the identities of the parties to the visitation, the relationship between them, their history of prior infractions, currently detected offensive material, etc.

Figure 6C:
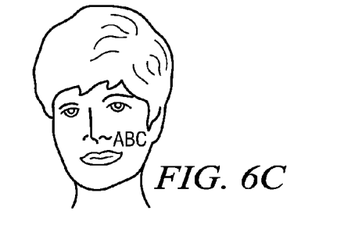
Figure 6D:
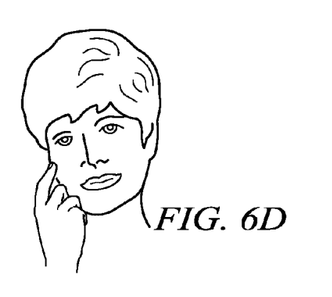

FIG. 6C shows a situation where a non-resident is attempting to convey information by putting words or symbols in the facial region. As before, security module 320 may detect the symbols using various techniques, such as optical character recognition (OCR), intelligent character recognition (ICR), object detection using Haar Classifiers, etc. It should be noted that any suitable detection algorithm may be used. FIG. 6D shows a situation where a non-resident is attempting to convey information by hand gestures or sign language in the video stream. As before, security module 320 may detect the hand gestures with object detection using Haar Classifiers or other suitable algorithms. If disallowed gestures are detected, the security model 320 may then blank the video, notify an officer, deface a portion of the image or perform other corrective actions.

Figure 6E:
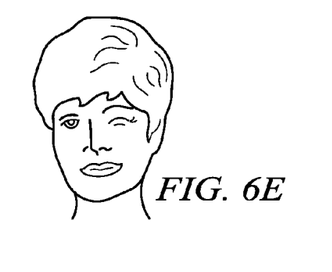

FIG. 6E shows a case where a non-resident is attempting to convey information by unnatural bodily motion such as, for example, winking in Morse code. Other examples of non-natural bodily movement may include excessive blinking, winking, eyebrow movements, head nodding, head shaking, head rotation, nostril flaring, and/or mouth and tongue movements unrelated to speech. As before, security module 320 may detect the bodily motions with facial recognition and/or object detection using Haar classifiers or the like. In some embodiments, counting of the bodily movement and comparison to human reference norms may be applied to enhance the detection accuracy. If unnatural bodily movements are detected such that their number, magnitude, and/or frequency meet threshold value(s), security engine 320 may then blank the video, notify an officer, deface a portion of the image or perform other corrective actions.

In some embodiments, security engine 320 may be configured to detect non-biometric object or feature information in the first image including, for example, tattoos, make-up, hairstyle, hats, jewelry, or clothing. The detected non-biometric object may be compared to a database of forbidden or suspected objects and, if a match is detected, security engine 320 may take appropriate action. In other embodiments, security engine 320 may detect mouth movements and it may analyze speech to determine a correlation between those movements and the accompanying audio or sounds, such as by comparing when sounds start and stop to mouth movement. If the correlation is below a threshold value, then security engine 320 may mute the audio portion of the video stream and/or take other corrective action. In yet other embodiments, security module 320 may use the detected gestures, objects, symbols, tattoos, etc. to automatically identify an affiliation of the resident or non-resident with a given gang or group.

Figure 7:
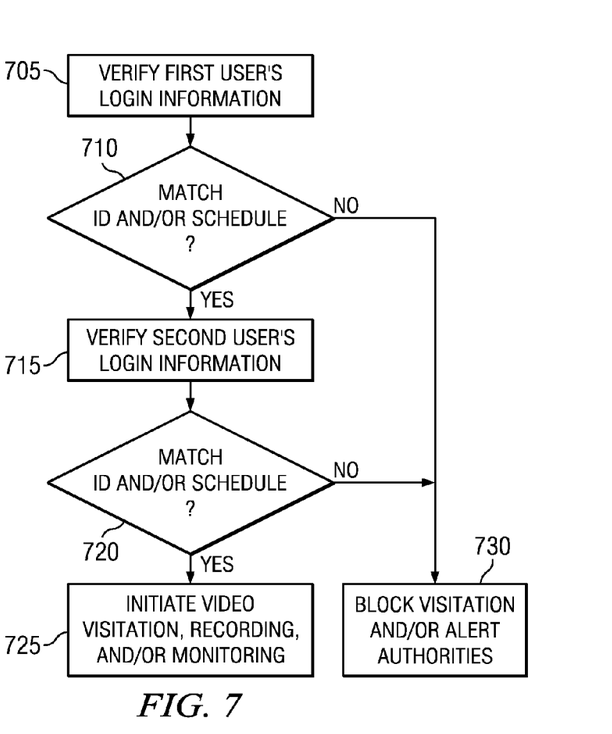
FIG. 7 is a flowchart of a video visitation authentication process according to some embodiments.

FIG. 7 is a flowchart of a video visitation authentication process. In some embodiments, the process of FIG. 7 may be performed, at least in part, by security module 320 of FIG. 3 executed by one of video visitation stations 200A-N. At block 705 the process may verify a first user's login information. For example, the first user may be an inmate, and the login verification or authentication operation may include retrieving a visitation record and obtaining identification information from the inmate (e.g., ID, biometrics, facial image, etc.). At block 710, the process may determine whether the resident's information matches the information stored in the visitation record and/or whether the visitation is properly scheduled.

If so, at block 715 the process may verify a second user's login information. For example, the second user may be a non-resident, and the process may collect his or her identification information. At block 720 the process may determine whether the second user's ID information and/or visitation schedule matches the visitation record. For example, the non-resident may have pre-registered with prison administration system 100 to access video visitation services, and may have received a username/password combination and/or may have provided a facial image. If there is match, at block 725 the process may initiate a video visitation session between the first and second users. Also, in some cases, the video visitation may be recorded and/or monitored by prison staff.

At blocks 710 and/or 720, if there is not a match between the first or second user's identification information and the video visitation record, or if the attempted video visitation has not been properly scheduled (e.g., there is no record of the visitation in prison administration system 100 or the day/time is different), the process may initiate corrective action at block 730. For example, the process may block or terminate the video visitation session, it may record the video visitation session, it may flag of the video visitation session (e.g., for concurrent or future review by prison staff or investigators), or it may notify a third-party (e.g., prison administration).

Figure 8:
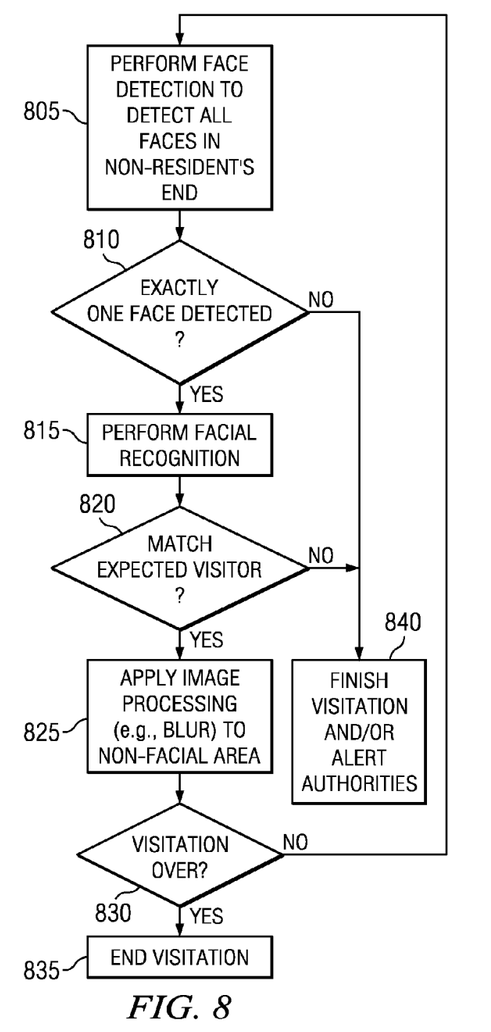
FIG. 8 is a flowchart of a video visitation security method according to some embodiments.

FIG. 8 is a flowchart of a video visitation security method. Similarly as described above, in some embodiments, the method of FIG. 8 may be performed, at least in part, by security module 320 of FIG. 3 executed by one of video visitation stations 200A-N. At block 805, the method may perform face detection to detect all faces in a video stream received from a non-residents communication device 135A-N during a video visitation session. It is assumed, for sake of illustration only, that a visitation record corresponding to the visitation session only allows for exactly one (1) non-resident to participate in the session. However, it should be understood that this method may be readily modified so that any number of authorized non-residents may participate in a given session. In this case, at block 810 the method may determine whether the number of faces detected in the non-residents video stream matches the number of visitors indicated in the visitation record—i.e., one. If so, at block 815 the method may perform facial recognition to identify the non-resident. At block 820, if the face of the non-resident matches a facial image or signature previously stored for that person, then control passes to block 825. Additionally or alternatively, if one or more visitors expected to participate in the visitation session as determined by the visitation record are not identified in the video feed, then the method may add information to the visitation record making a note of the expected visitor's absence.

At block 825, the method may apply any suitable image processing technique (e.g., blurring, clouding, darkening, distorting, masking, shading, etc.) to areas of the video image outside of the detected face. At block 830, the method may determine whether the visitation session is over. If so, the method may end visitation at block 835. Otherwise control may return to block 805, and the method may continuously or periodically detect face(s) present in the non-resident's video stream.

At block 810, if the number of faces detected in the non-resident's stream is greater than the number of visitors prescribed in the video visitation record, the method may take appropriate corrective action (e.g., terminate, record, or flag the session, notify a third-party, etc.) at block 840. Similarly, if at block 820 the face(s) detected in the video stream is (are) not recognized as belonging to authorized or expected visitor(s), the method may initiate corrective action at block 840.

Figure 9:
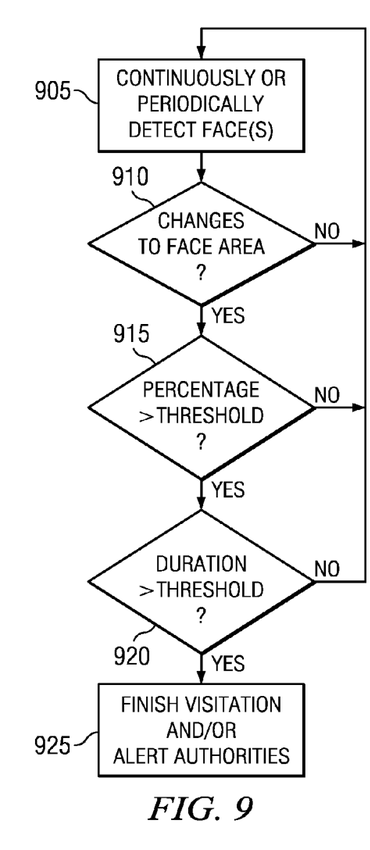
FIG. 9 is a flowchart of another video visitation security method according to some embodiments.

FIG. 9 is a flowchart of another video visitation security method according to some embodiments. Again, the method of FIG. 9 may be performed, for example, at least in part, by security module 320 of FIG. 3 executed by one of video visitation stations 200A-N. At block 905, the method may continuously or periodically detect one or more faces in a video stream during a visitation session. At block 910, the method may determine whether any changes have in the facial area have taken place, as well as the magnitude of those changes. For instance, a non-resident may attempt to introduce the image of a foreign object or the like in the video stream (e.g., FIGS. 6A-B). If so, at block 915 the method may determine whether the magnitude of the changes (e.g., indicated as a percentage of the detected face area (e.g., 610A) is larger than a threshold amount. For example, the changes shown in FIG. 6B appear to be larger than the changes shown in FIG. 6A. If so, at block 920 the method may determine whether the change has lasted longer than a time duration threshold value. For example, in some cases, quick changes (e.g., the non resident may wave at the inmate with his or her hands, or may briefly scratch his or her nose, etc.) may not be characterized as attempts to overcome security measures. If the change has lasted longer than the threshold amount, however, at block 925 the method may initiate corrective action. At blocks 910, 915, and/or 920, if there are no changes to the detected facial area(s), the magnitude of the changes does not meet a magnitude threshold, and/or if the duration of the changes does not meet a time threshold, control may return to block 905.

Additionally or alternatively, blocks 910 and 915 may be modified to include a lower change magnitude threshold. For example, it some cases, to prevent a non-resident to attempt to circumvent security measures by providing a still photograph or image of a person as his or her outgoing video feed, block 910 may require that a minimum amount of change be detected in the facial area, otherwise control may pass to block 925. Additionally or alternatively, block 915 may also verify that the magnitude of the changes in the facial area (e.g., as a percentage of total face image), while smaller than an upper threshold value (e.g., 80 or 90%), are nonetheless larger than a lower threshold value (e.g., 10 or 20%); otherwise control may also pass to block 925.

Although discussed in examples herein in the context of live or real-time video streams or feeds, it should be understood that the systems and techniques described herein may also be applicable to non-real-time communications conducted between residents and non-residents of controlled-environment facilities. Moreover, these systems and methods may also be applicable to still images and other types of communications. Examples of such communications may include, but are not limited to, email, texting, scanned of postal mail or other photos, website pictures, blog photos, social media images, news report photos, etc. For example, in the case of email communications, security engine 320 of FIG. 3 may receive image attachments (e.g., a photograph or video clip) and deface areas outside of the face of a particular subject prior to forwarding or returning the secure attachment to the prison's e-mail server or communication system.

The various systems and methods illustrated in the figures and described herein represent example embodiments of video visitation security systems for controlled-environment facilities. These techniques may be implemented in software, hardware, or a combination thereof. The order in which each operation of a given method is performed may be changed, and various elements of the systems illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A method for videoconference security comprising:
 performing, by one or more computer systems,
 receiving, over a computer network, identification information associated with a first party and/or a second party;
 detecting a first image of a first face in a video stream transmitted between the first party and the second party during a videoconference session, the first image occupying a first area on a display upon rendering of the video stream; and
 defacing other areas on the display outside of the first area in response to the identification information received.

2. The method of claim 1, wherein the first party is a resident of a controlled-environment facility and the second party is a non-resident of the controlled environment facility, and wherein the videoconference session is a video-visitation session between the resident and non-resident.

3. The method of claim 1, wherein the video stream is a pre-recorded or delayed transmission video message.

4. The method of claim 2, wherein the controlled-environment facility is a jail or prison, and wherein the resident of the controlled-environment facility is an inmate.

5. The method of claim 1, wherein defacing includes blurring, clouding, darkening, distorting, blanking, masking, or shading.

6. The method of claim 1, further comprising:
 performing, by the one or more computer systems,
 performing facial recognition on the first image; and
 in response to the facial recognition determining that the first face does not match a face of an authorized person, causing at least one of: termination of the videoconference session, blanking of the video stream, recording of the videoconference session, flagging of the videoconference session, or notification of a third-party.

7. The method of claim 6, wherein performing the facial recognition includes retrieving a videoconference record including a facial characteristic of the authorized person.

8. The method of claim 1, further comprising:
 performing, by the one or more computer systems,
 detecting a second image of a second face in the video stream during the videoconference session, the second image occupying a second area on the display upon rendering of the video stream,
 wherein defacing the other areas on the display outside the first area includes defacing areas on the display outside the first and second areas in response to detection of the first image of the first face and detection of the second image of the second face.

9. The method of claim 8, further comprising:
 performing, by the one or more computer systems,
 retrieving a videoconference record corresponding to the videoconference session, the video visitation record including a number of authorized persons; and
 determining that the number of authorized persons is greater than 1.

10. The method of claim 1, further comprising:
 performing, by the one or more computer systems,
 detecting a second image of a second face in the video stream during the videoconference session;
 retrieving a videoconference record corresponding to the videoconference session, the videoconference record including a number of authorized persons;
 determining that the number of authorized persons is equal to 1; and
 causing at least one of: termination of the videoconference session, recording of the videoconference session, flagging of the videoconference session, or notification of a third-party.

11. The method of claim 1, wherein the detecting and defacing occur continuously during the videoconference session, and wherein the size and position of the first image changes throughout the videoconference session.

12. The method of claim 1, further comprising:
 performing, by the one or more computer systems,
 detecting a change in the first image;
 determining a magnitude of the change; and
 in response to the magnitude of the change meeting a magnitude threshold, causing at least one of: termination of the videoconference session, recording of the videoconference session, flagging of the videoconference session, or notification of a third-party.

13. The method of claim 1, further comprising:
 performing, by the one or more computer systems,
 detecting a change in the first image;
 determining a duration of the change; and in response to the duration of the change meeting a duration threshold, causing at least one of: termination of the videoconference session, recording of the videoconference session, flagging of the videoconference session, or notification of a third-party.

14. The method of claim 1, further comprising:
performing, by the one or more computer systems,
in response to detecting an alphabetic, numeric, or symbolic character in the first image, causing at least one of: termination of the videoconference session, defacing of the character, blanking of the video stream, recording of the videoconference session, identifying an affiliation of the first party or second party with a given gang or group, flagging of the videoconference session, or notification of a third-party.

15. The method of claim 1, further comprising:
performing, by the one or more computer systems,
in response to detecting a non-biometric object in the first image, causing at least one of: termination of the videoconference session, defacing of the non-biometric object, blanking of the video stream, recording of the videoconference session, identifying an affiliation of the first party or second party with a given gang or group, flagging of the videoconference session, or notification of a third-party.

16. The method of claim 1, further comprising:
performing, by the one or more computer systems,
detecting a bodily movement in the first image unrelated to speech;
quantifying the bodily movement; and
and in response to the quantified bodily movement meeting a threshold value, causing at least one of: termination of the videoconference session, defacing of the bodily movement, blanking of the video stream, recording of the videoconference session, identifying an affiliation of the first party or second party with a given gang or group, flagging of the videoconference session, or notification of a third-party.

17. The method of claim 1, further comprising:
performing, by the one or more computer systems,
in response to detecting a hand gesture or sign language in the first image, causing at least one of: termination of the videoconference session, defacing of the hand gesture or sign language, blanking of the video stream, recording of the videoconference session, flagging of the videoconference session, identifying an affiliation of the first party or second party with a given gang or group, or notification of a third-party.

18. The method of claim 1, further comprising:
performing, by the one or more computer systems,
determining a magnitude of a correlation between a mouth movement and speech in the video stream; and
in response to the magnitude of the correlation meeting a threshold value, causing at least one of: termination of the videoconference session, defacing of the bodily movement, muting of the speech, blanking of the video stream, recording of the videoconference session, identification of an affiliation of the first party or second party with a given gang or group, flagging of the videoconference session, or notification of a third-party.

19. A security system, comprising:
at least one processor; and
a memory coupled to the at least one processor, the memory configured to store program instructions executable by the at least one processor to cause the system to:
receive, over a computer network, identification information associated with a first party;
receive, over a computer network, identification information associated with a second party;
identify a communication between the first party and the second party;
detect one or more images of one or more faces present in electronic content transmitted by the first party or the second party within or during the communication, the one or more images of the one or more faces occupying one or more corresponding areas upon rendering or printing of the electronic content; and
degrade portions of the one or more images outside of the one or more areas in response to the identification information received.

20. The system of claim 19, wherein the communication is a non-real-time communication, and wherein electronic content includes an email, a text, a scanned postal mail, a website picture, a blog photo, a social media image, or a news report.

21. The system of claim 19, wherein the communication is a video visitation session, and wherein the program instructions are further executable by the at least one processor to cause the system to:
retrieve a video visitation record, the record indicating a number of visitors expected during the video visitation session; and
in response to the number of expected visitors being smaller than the number of one or more images of the one or more faces, terminate the video visitation session, record the video visitation session, flag the video visitation session, and/or notify a third-party.

22. The system of claim 19, wherein the communication is a video visitation session, and wherein the program instructions are further executable by the at least one processor to cause the system to:
retrieve a video visitation record, the record indicating a number of visitors expected during the video visitation session; and
in response to the number of expected visitors being greater than the number of one or more images of the one or more faces, record an absence of an expected visitor in the video visitation record.

23. The system of claim 19, wherein the communication is a video visitation session, and wherein the program instructions are further executable by the at least one processor to cause the system to:
retrieve a video visitation record, the record including a facial characteristic of visitors expected during the video visitation session;
perform facial recognition upon the one or more images of one or more faces; and
in response to the facial recognition determining that at least one of the one or more faces do not match facial characteristic, terminate the video visitation session, record the video visitation session, flag the video visitation session, and/or notify a third-party.

24. The system of claim 19, wherein the communication is a video visitation session, and wherein the program instructions are further executable by the at least one processor to cause the system to:
detect a change in the one or more images;
determine a magnitude of the change;
in response to the magnitude of the change meeting a magnitude threshold, determine a duration of the change; and
in response to the duration of the change meeting a duration threshold, terminate the video visitation session, record the video visitation session, flag the video visitation session, and/or notify a third-party.

25. A non-transitory computer-readable storage medium having video visitation security program instructions stored thereon that, upon execution by one or more computer systems, cause the one or more computer systems to:
- identify a video visitation session between a resident of a controlled-environment facility and a non-resident of the controlled-environment facility;
- detect one or more images of one or more faces present in a video stream transmitted by the non-resident and received by the resident, the one or more images of the one or more faces occupying one or more facial areas upon rendering of the video stream on a screen accessible to the resident during the video visitation session;
- in response to a number of the one or more faces matching an expected number of faces prescribed by a video visitation record, perform facial recognition upon the one or more images of the one or more faces; and
- in response to the facial recognition determining that the one or more faces match one or more faces of expected visitors and prescribed by the video visitation record, allow the video visitation session to take place while disfiguring areas outside of the one or more facial areas on the screen.

26. The non-transitory computer-readable storage medium of claim 25, wherein the program instructions, upon execution by the one or more computer systems, cause the one or more computer systems to, in response to the number of the one or more faces not matching the expected number of faces prescribed by the video visitation record, take corrective action.

27. The non-transitory computer-readable storage medium of claim 25, wherein the program instructions, upon execution by the one or more computer systems, cause the one or more computer systems to, in response to the facial recognition determining that the one or more faces do not match the one or more faces of expected visitors and prescribed by the video visitation record, take corrective action.

28. The non-transitory computer-readable storage medium of claim 25, wherein the program instructions, upon execution by the one or more computer systems, cause the one or more computer systems to:
- detect a change in the one or more images;
- determine a magnitude of the change;
- in response to the magnitude of the change meeting a magnitude threshold, determine a duration of the change; and
- in response to the duration of the change meeting a duration threshold, take corrective action.

* * * * *